(12) United States Patent
Hanson et al.

(10) Patent No.: US 9,934,802 B2
(45) Date of Patent: *Apr. 3, 2018

(54) HYSTERESIS COMPENSATION IN A DISC DRIVE

(71) Applicant: SEAGATE TECHNOLOGY LLC, Cupertino, CA (US)

(72) Inventors: Reed D. Hanson, Chaska, MN (US); Kenneth A. Haapala, Plymouth, MN (US); Dwight R. Kinney, Longmont, CO (US); Xinghui Huang, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,942

(22) Filed: Aug. 7, 2017

(65) Prior Publication Data
US 2017/0352370 A1 Dec. 7, 2017

Related U.S. Application Data

(63) Continuation of application No. 15/170,811, filed on Jun. 1, 2016, now Pat. No. 9,728,213.

(51) Int. Cl.
*G11B 5/55* (2006.01)
*G11B 5/48* (2006.01)
*G11B 5/596* (2006.01)

(52) U.S. Cl.
CPC ............ *G11B 5/556* (2013.01); *G11B 5/4873* (2013.01); *G11B 5/59622* (2013.01)

(58) Field of Classification Search
CPC ... G11B 5/5521–5/5539; G11B 5/5552–5/556; G11B 5/596–5/59605; G11B 5/59622
USPC .......................... 360/55, 69, 75, 78.05, 78.09
See application file for complete search history.

(56) References Cited

U.S. PATENT DOCUMENTS

| | | | |
|---|---|---|---|
| 6,693,763 B2 | 2/2004 | Bi et al. |
| 7,250,738 B1 | 7/2007 | Ting et al. |
| 7,869,157 B2 | 1/2011 | Nagashima et al. |
| 8,279,551 B2 | 10/2012 | Higa et al. |
| 8,363,350 B2 | 1/2013 | Matsuzawa |
| 9,153,283 B1 | 10/2015 | Xi et al. |

OTHER PUBLICATIONS

Voros, J., "Modeling and Identification of Hysteresis Using Special Forms of the Coleman-Hodgdon Mode," Journal of Electrical Engineering, vol. 60, No. 2, 2009, 100-105.
Merry, R. et al, "Modeling and Compensation of Asymmetric Hysteresis in a Piezo Actuated Metrological AFM," American Control Conference, Jun. 10-12, 2009.

*Primary Examiner* — Joseph Feild
*Assistant Examiner* — James L Habermehl
(74) *Attorney, Agent, or Firm* — Holland & Hart LLP

(57) ABSTRACT

Systems and methods for compensating for hysteresis in a disc drive are described. In one embodiment, a method may use an inverse hysteresis model to linearize effects of hysteresis of a microactuator in the disc drive. The hysteresis model may be a Coleman-Hodgdon hysteresis model. The hysteresis of the microactuator may be characterized, and the inverse hysteresis model may be based at least in part on the characterization. The inverse hysteresis model may be used to implement a digital filter. The digital filter may be employed in series with the microactuator to linearize the effects of hysteresis.

20 Claims, 5 Drawing Sheets

HYSTERESIS COMPENSATION IN A DISC DRIVE

CROSS-REFERENCE TO RELATED APPLICATIONS

This application is a continuation application of U.S. patent application Ser. No. 15/170,811, filed on Jun. 1, 2016, and entitled HYSTERESIS COMPENSATION IN A DISC DRIVE, now U.S. Pat. No. 9,728,213, issued 8 Aug. 2017, the disclosure of which is incorporated herein, in its entirety, by this reference.

SUMMARY

The present disclosure is directed to methods and systems for compensating for hysteresis in a disc drive. In some embodiments, the present systems and methods may linearize the effects of hysteresis of a microactuator of the disc drive.

A storage device for hysteresis compensation is described. In one embodiment, the storage device may include a data storage medium, at least one microactuator configured to move at least one read/write head relative to the data storage medium, and a hysteresis compensator to compensate for hysteresis of the at least one microactuator using a digital filter based at least in part on an inverse hysteresis model, wherein the inverse hysteresis model is determined by the hysteresis compensator based at least in part on the hysteresis of the at least one microactuator.

In some embodiments, the hysteresis compensator may use a Coleman-Hodgdon hysteresis model. In some embodiments, the digital filter may be in series with the at least one microactuator. In some embodiments, the hysteresis compensator may characterize the hysteresis of the at least one microactuator and determine parameters for the inverse model of the hysteresis based at least in part on the characterized hysteresis of the at least one microactuator. In some cases, the storage device may further include a servo controller associated with the at least one microactuator. The servo controller may be set to a single-stage mode for the hysteresis compensator to characterize the hysteresis of the at least one microactuator. In some configurations, the hysteresis compensator may characterize the hysteresis of the at least one microactuator while the servo controller drives at least two heads associated with the at least one microactuator out of phase using a direct current (DC) voltage. The servo controller may vary the DC voltage over an entire driving range of the at least one microactuator for the characterizing.

An apparatus for hysteresis compensation is also described. In one embodiment, the apparatus may include at least one microactuator configured to move at least one read/write head relative to a data storage medium, and a hysteresis compensator to compensate for hysteresis of the at least one microactuator using an inverse hysteresis model.

A method for hysteresis compensation is also described. In one embodiment, the method may include obtaining a characterization of hysteresis of a microactuator in a disc drive, determining parameters for an inverse model of the hysteresis according to the characterization, and compensating for the hysteresis of the microactuator using the inverse hysteresis model.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
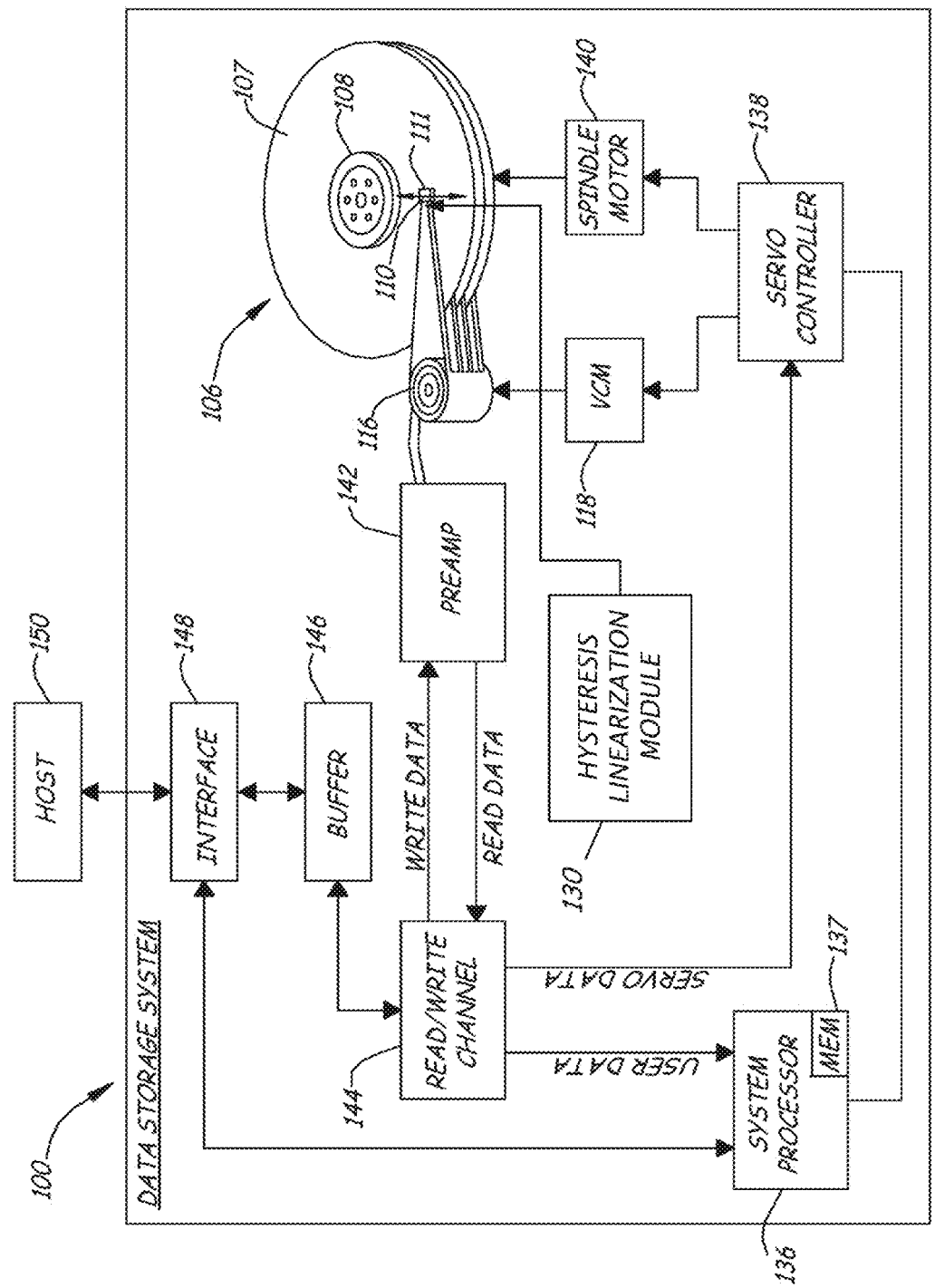
FIG. 1 is a block diagram of an example of a system in accordance with various embodiments.

The following relates generally to hysteresis compensation in a disc drive. A disc drive typically includes one or more microactuators for driving read/write heads relative to a storage medium. The microactuator(s) may exhibit hysteresis. For example, a piezoelectric transducer (PZT) microactuator, which may be employed to obtain precise tracking, may suffer from significant hysteresis. Servo performance of the disc drive may be degraded by the non-linear behavior of the microactuator caused by the hysteresis if not addressed. For example, such hysteresis may result in a non-linear gain in the servo loop, may cause distortion of feedforward signals through the associated non-linear transfer function, and may be a source of error when a DC head skew table is updated.

In one embodiment, an efficient method to implement a digital filter is disclosed. The digital filter may be placed in series with the microactuator (e.g., the PZT element thereof) to linearize the effects of the hysteresis of the microactuator. As used herein, the term "linearize" is intended to mean "make more linear." Thus, it should be understood that linearizing may not result in a complete linearization of the hysteresis effects, but at least results in a more linear performance of the microactuator as compared to that achieved without hysteresis compensation.

The filter described herein may be implemented using a Coleman-Hodgdon hysteresis model. Coleman-Hodgdon models have been used to model and simulate hysteresis. However, such models have not been used to compensate for hysteresis as described herein, namely using an inverse of the model to linearize a system.

In the case of a PZT microactuator, the hysteresis of the microactuator is characterized, such as described further below, and parameters of the Coleman-Hodgdon hysteresis model are determined based on the characterization of the hysteresis (e.g., to fit the actual hysteresis curve that characterizes the hysteresis of the microactuator). Once the parameters are determined, the inverse of the Coleman-Hodgdon hysteresis model may be implemented as a digital filter for the microactuator.

The present disclosure also describes a method to characterize the hysteresis of the microactuator. In one embodiment, the characterization process involves switching to a single-stage mode, for example, by setting a servo controller associated with the microactuator to the single-stage mode. Normally, tracking control in a disc drive employing a microactuator operates in a dual-stage mode in which the microactuator and a second actuator (for moving a slider, described further below) are regulated by the servo controller simultaneously. In the single-stage mode, the servo controller regulates only the second actuator (e.g., through a voice coil motor (VCM)) with the microactuator being open loop. This allows different signals to be applied to the microactuator for characterizing the hysteresis. In one embodiment, a direct current (DC) voltage is applied to drive a pair of read/write heads out of phase and a change in DC skew is measured. The DC voltage is ramped up and down over an entire driving range of the microactuator (e.g., the PZT element) with measurements being made to generate a hysteresis curve for the microactuator. As discussed above and further herein, the parameters of the hysteresis model being employed (e.g., Coleman-Hodgdon) are determined so that the model fits the inverse of the generated hysteresis curve.

FIG. 1 is a block diagram illustrating one embodiment of a data storage system 100 (e.g., a disc drive system) in which the present systems and methods may be implemented. The data storage system 100 includes media 106, such as a plurality of discs 107, which are mounted on a spindle motor 140 by a clamp 108. Each surface of the media 106 has an associated slider 110, which carries a read/write head 111 for communication with the media surface. Sliders 110 are supported by suspensions and track accessing arms of an actuator mechanism 116. For example, the actuator mechanism 116 can be of the type known as a rotary moving coil actuator and includes a voice coil motor (VCM) 118. The VCM 118 rotates actuator mechanism 116 about a pivot shaft to position sliders 110 over a desired data track along an arcuate path between an inner diameter (ID) and an outer diameter (OD) of respective discs 7. The VCM 118 is driven by electronic circuitry based on signals generated by the read/write heads 111 and a host computer 150. Although not shown in FIG. 1 (but illustrated in FIG. 3), each of the sliders 110 may be implemented with a microactuator that pivots to move the associated read/write head 111 along a second arcuate path.

As previously discussed, media 106 can includes a plurality of discs 107. Each disc 107 has a plurality of substantially concentric circular tracks. Each track is subdivided into a plurality of storage segments. As defined herein, a storage segment is the basic unit of data storage in media 106. Each storage segment is identified and located at various positions on media 106. In the disc-type media example, storage segments or data sectors are "pie-shaped" angular sections of a track that are bounded on two sides by radii of the disk and on the other side by the perimeter of the circle that defines the track. Each track has related logical block addressing (LBA). LBA includes a cylinder address, head address and sector address. A cylinder identifies a set of specific tracks on the disk surface to each disc 107 which lie at equal radii and are generally simultaneously accessible by the collection of read/write heads 111. The head address identifies which head can read the data and therefore identifies which disk from the plurality of discs 107 the data is located. As mentioned above, each track within a cylinder is further divided into sectors for storing data and servo information. The data sector is identified by an associated sector address.

The data storage system 100 includes a system processor 136, which is used for controlling certain operations of data storage system 100 in a known manner. The various operations of data storage system 100 are controlled by system processor 136 (e.g., storage controller) with the use of programming and/or instructions stored in a memory 137. The data storage system 100 also includes a servo controller 138, which generates control signals applied to the VCM 118 and spindle motor 140 (as well as the microcontroller, not shown). The system processor 136 instructs the servo controller 138 to seek read/write head 111 to desired tracks. The servo controller 138 is also responsive to servo data, such as servo burst information recorded on disc 107.

The data storage system 100 further includes a preamplifier (preamp) 142 for generating a write signal applied to a particular read/write head 111 during a write operation, and for amplifying a read signal emanating from a particular read/write head 111 during a read operation. A read/write channel 144 receives data from the system processor 136 during a write operation, and provides encoded write data to the preamplifier 142. During a read operation, the read/write channel 146 processes a read signal generated by the preamplifier 142 in order to detect and decode data recorded on the discs 107. The decoded data is provided to the system processor 136 and ultimately through an interface 148 to a host computer 150.

In some configurations, the data storage system 100 may include a hysteresis compensator, such as a hysteresis linearization module 130. In one example, the data storage system 100 may be a component of a host (e.g., operating system, host hardware system, etc.). The hysteresis linearization module 130 may compensate for hysteresis of the microactuator (not shown), for example, by implementing a digital filter in series with the microactuator.

Figure 2:
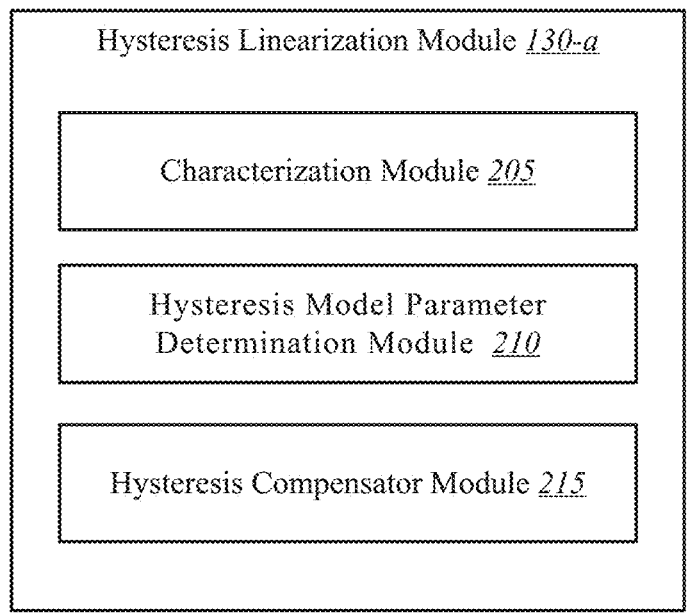
FIG. 2 shows a block diagram of a module in accordance with various aspects of this disclosure.

FIG. 2. shows a block diagram 200 of an hysteresis linearization module 130-a. The hysteresis linearization module 130-a may include one or more processors, memory, and/or one or more storage devices. The hysteresis linearization module 130-a may include a characterization module 205, a hysteresis model parameter determination module 210, and a hysteresis compensator module 215. Each of these components may be in communication with each other. The hysteresis linearization module 130-a may be one example of the hysteresis linearization module 130 of FIG. 1.

As described herein, the characterization module 205 is configured to characterize the hysteresis of the microactuator. Although various details for characterizing the hysteresis of the microactuator are described, it should be understood that the hysteresis of the microactuator may be determined or otherwise obtained in any suitable manner. As described further below, the characterization module 205 determines an estimate of the hysteresis that can be used for modeling the hysteresis.

The hysteresis model parameter determination module 210 is configured to determine parameters for a hysteresis model based at least in part on the characterization of the microactuator hysteresis provided by the characterization module 205. In general, the hysteresis model parameter determination module 210 determines the parameters so that the hysteresis model models the characterization.

As discussed above, one model for hysteresis is a Coleman-Hodgdon (C-H) model. The C-H hysteresis model is particularly suitable for modeling the hysteresis of a PZT microactuator as described herein. However, it should be understood that any other hysteresis model may be employed for the described systems and methods, for example, depending on the characteristics of the particular microactuator.

From known literature, the C-H hysteresis model may be expressed in terms of a difference equation:

$$y(t+1) - y(t) = -p_1 y(t)|u(t+1) - u(t)| +$$
$$p_2 h[-u(t)]u(t)|u(t+1) - u(t)| + p_3 h[u(t)]u(t)|u(t+1) - u(t)| +$$
$$p_4 h[D_R - u(t)]u(t)|u(t+1) - u(t)| + p_5 h[u(t) - D_L]u(t)|u(t+1) - u(t)| -$$
$$p_6 \xi_1(t)|u(t+1) - u(t)| - p_7 \xi_2 t|u(t+1) - ut| + p_8 [u(t+1) - u(t)] +$$
$$p_9 h[u(t) - D_R]h_L[D_L - u(t)][u(t+1) - u(t)],$$

where $$h(s) = \begin{cases} 0, & \text{if } s > 0 \\ 1, & \text{if } s \leq 0 \end{cases}$$

$$\xi_1(s) = (m_{R2} - m_{R1})h(D_R - s)$$

$$\xi_2(s) = (m_{L2} - m_{L1})h(s - D_L)$$

and $p_1$ through $p_9$ are model coefficients
and $m_{R1}$, $m_{R2}$, $m_{L1}$, $m_{L2}$, $D_R$ and $D_L$ are additional model parameters.

The C-H hysteresis model as expressed above is a non-linear equation that includes fifteen (15) constant parameters, nine (9) of which are independent (parameter dependence being omitted for brevity).

The parameters of the C-H hysteresis model can be estimated by forming a data vector $\Phi(t)$ and a parameter vector $\Theta$ as follows:

$$\Phi(t) = [-y(t)|u(t+1)-u(t)|, h[-u(t)]u(t)|u(t+1)-u(t)|, h[u(t)]u(t)|u(t+1)-u(t)|, h[D_R-u(t)]u(t)|u(t+1)-u(t)|, h[u(t)-D_L]u(t)|u(t+1)-u(t)|, \xi_1(t)|u(t+1)-u(t)|, -\xi_2(t)|u(t+1)-u(t)|, [u(t+1)-u(t)], h[u(t)-D_R]h[D_L-u(t)][u(t+1)-u(t)]]^T$$

$$\Theta = [p_1, p_2, \ldots, p_9]^T$$

From the data vector $\Phi(t)$ and a parameter vector $\Theta$, a pseudo linear form of the difference equation of the C-H hysteresis model can be obtained:

$$y(t+1) - y(t) = \Phi^T(t)\Theta$$

As expressed in the pseudo linear form, the parameters of the C-H hysteresis model can be estimated, for example, using a least-mean-square-error (LMSE) estimation technique. Because the model is non-linear, iterations may be used to refine and update dependent non-linear parameters that appear in the data vector $\Phi(t)$.

As discussed above, the parameters of the C-H hysteresis model are determined based at least in part on the characterization of the microactuator hysteresis provided by the characterization module 205. More specifically, the parameters of the C-H hysteresis model are determined to fit the inverse of the hysteresis characterization.

Either the characterization module 205 or the hysteresis compensator module 210 can obtain the inverse of the hysteresis characterization. For example, where the obtained characterization of the hysteresis for the microactuator is expressed as y=f(u), the inverse can be obtained by swapping vectors y and u to obtain the inverse expressed as u=g(y). This approach avoids an inefficient mathematical computation to arrive at the inverse $u=f^{-1}(y)$. However, it should be understood that obtaining the inverse $u=f^{-1}(y)$ mathematically and then determining parameters for a hysteresis model according to the obtained inverse is possible.

The parameters of the C-H hysteresis model then can be determined, for example, by the hysteresis compensator module 215. For example, the LMSE estimation technique described above may be employed (with the vectors y and u swapped) to obtain the parameters, and thus obtain the inverse model for compensation.

The hysteresis compensator module 215 then uses the inverse model to linearize the hysteresis of the microactuator. For example, the hysteresis compensator module 215 can implement a digital filter based on the inverse model, which is placed in series with the microactuator (e.g., between the microactuator and the servo controller). The digital filter can be implemented using the difference equation with u(t) being the pre-compensation control input from the servo controller and y(t) being the compensated output fed to the microactuator.

One or more of the components of the hysteresis linearization module 130-a, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 3:
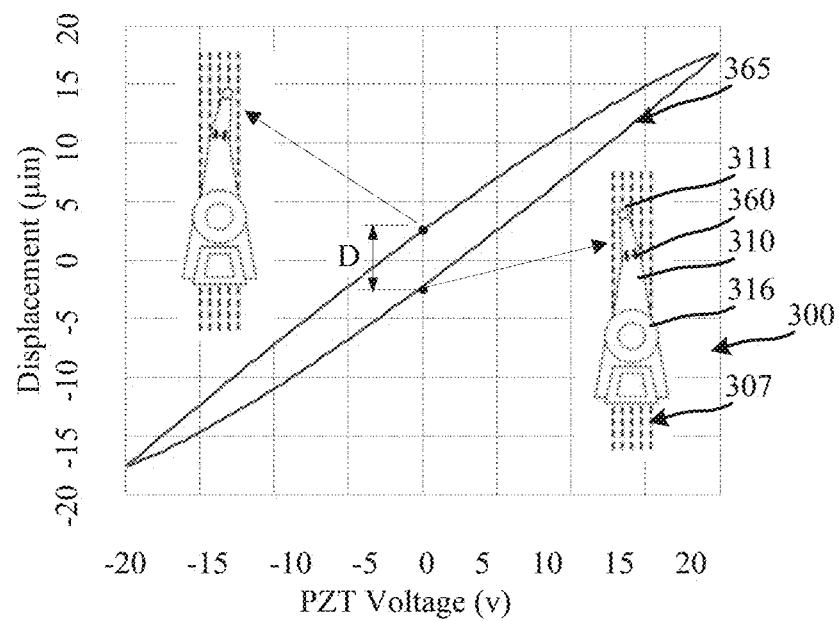
FIG. 3 shows an example of hysteresis associated with a microactuator as characterized in accordance with various aspects of this disclosure.

FIG. 3 shows an example of hysteresis associated with a microactuator as characterized in accordance with various aspects of this disclosure. For the sake of clarity, a depiction of subassemblies 300 that may be employed in the data storage system 100 shown in FIG. 1. Each subassembly 300 includes a slider 310, which carries a read/write head 311 for communication with the media surface, represented by tracks 307. The slider 110 is supported by suspensions and track accessing arms of an actuator mechanism 316. As shown, the slider 110 has two portions connected by a microactuator 360 that is configured to move the portion carrying the read/write head 311 relative to the other portion. Both portions of the slider 310 are moved by the actuator mechanism 316.

A characterization process may be implemented using the subassemblies 300 to determine a hysteresis curve 365 associated with the microactuator 360. The characterization process corresponds to the method for characterizing the hysteresis of the microactuator described above. The process/method may be performed by the characterization module 205 of FIG. 2, for example, in conjunction with various components of the data storage system 100 of FIG. 1.

As illustrated in FIG. 3, the characterization process involves switching to a single-stage mode so that the actuator mechanism 316 is regulated by the servo controller (e.g., 138 in FIG. 1) and the microactuators 360 are open loop, allowing different signals to be applied to the microactuators 360 for characterizing the hysteresis. Once in the single-stage mode, a head switch is performed to determine (e.g., calibrate) a baseline DC skew. Then, a direct current (DC) voltage is applied to the microactuators 360 to drive the respective read/write heads 311 out of phase, and a change in DC skew is measured. The applied DC voltage is ramped up and down over an entire driving range of the microactuators 360 with measurements being made to generate the hysteresis curve 365 for the microactuators 360. As shown in FIG. 3, the uncompensated hysteresis of the microactuators 360 is significantly non-linear, exhibiting a 4.7 micro inch (μin) displacement D between the read/write heads 311 at a zero volt input.

Figure 4:
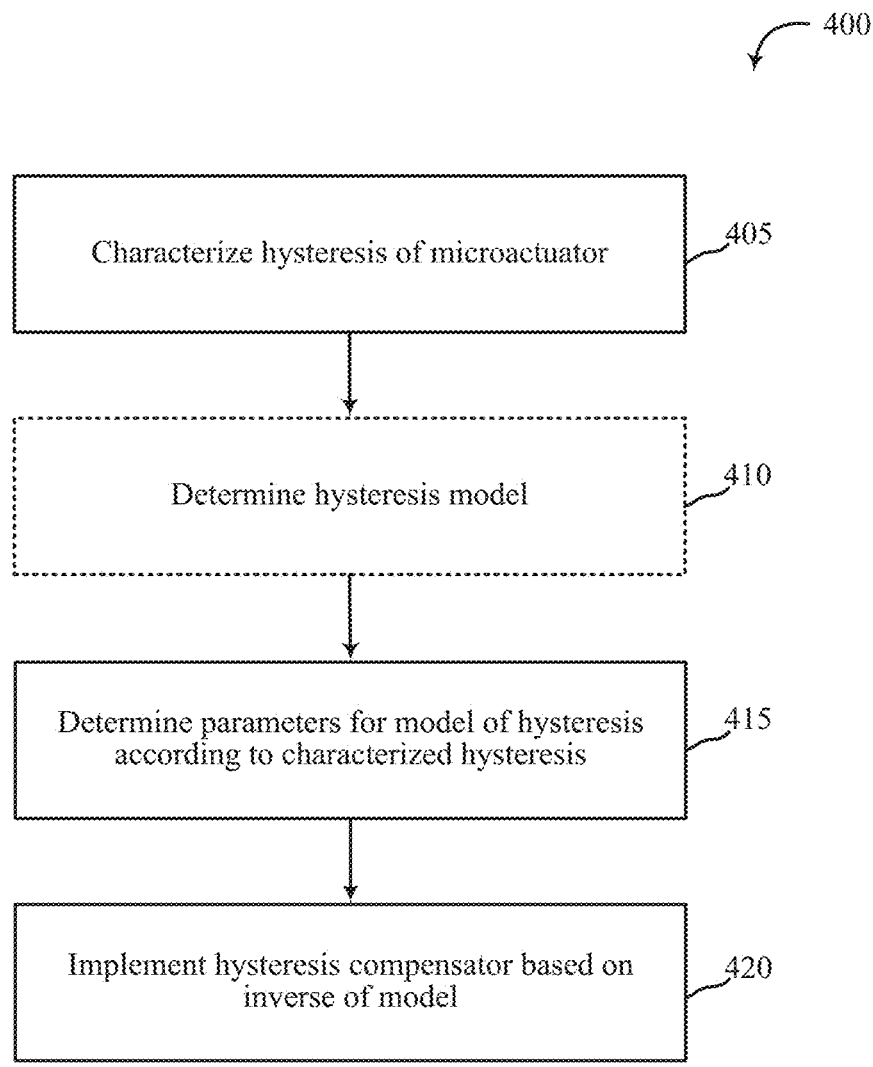
FIG. 4 is a flow chart illustrating an example of a method in accordance with various aspects of this disclosure.

FIG. 4 is a flow chart illustrating an example of a method 400 for hysteresis compensation in a disc drive, in accordance with various aspects of the present disclosure. One or more aspects of the method 400 may be implemented in conjunction with the data storage system 100 of FIG. 1, the hysteresis linearization module 130-*a* of FIG. 2, and/or the subassemblies 300 of FIG. 3. In some examples, a storage device may execute one or more sets of codes to control the functional elements of the storage device to perform one or more of the functions described below. Additionally or alternatively, the storage device may perform one or more of the functions described below using special-purpose hardware.

At block 405, the method 400 may include characterizing the hysteresis of the microactuator(s). Characterizing the hysteresis at block 405 may be performed in any suitable manner, such as described above with reference to FIG. 3. At block 410, the method 400 may include determining a hysteresis model for modeling the hysteresis of the microactuator(s). As illustrated by the dotted line of block 410, such operation(s) may be optional, for example, when the hysteresis model is predetermined for the microactuator(s) needing hysteresis compensation. In some cases, however, the method 400 may include the operation(s) at block 410 to be able to perform hysteresis compensation for multiple different types of microactuators. For example, the operation(s) at block 410 may involve determining the type of microactuator(s) to be compensated, and selecting a hysteresis model from a plurality of available hysteresis models based at least in part on the type of microactuator(s).

Next at block 415, the method 400 may include determining parameters for an inverse hysteresis model according to the characterized hysteresis of the microactuator(s). As discussed above, the operation(s) at block 415 may involve performing iterative estimations of the parameters to fit the hysteresis model to the characterized hysteresis (e.g., hysteresis curve of the microactuator(s)). Then at block 420, the method 400 may include implementing a hysteresis compensator, such as a digital filter placed in series with the microactuator(s), based on the inverse hysteresis model.

The operation(s) at block 405-420 may be performed using the hysteresis linearization module 130 described with reference to FIGS. 1 and 2 and/or another module. Thus, the method 400 may provide for hysteresis compensation in a disc drive that employs microactuators for precise tracking.

It should be noted that the method 400 is just one implementation and that the operations of the method 400 may be rearranged, omitted, and/or otherwise modified such that other implementations are possible and contemplated.

Figure 5:
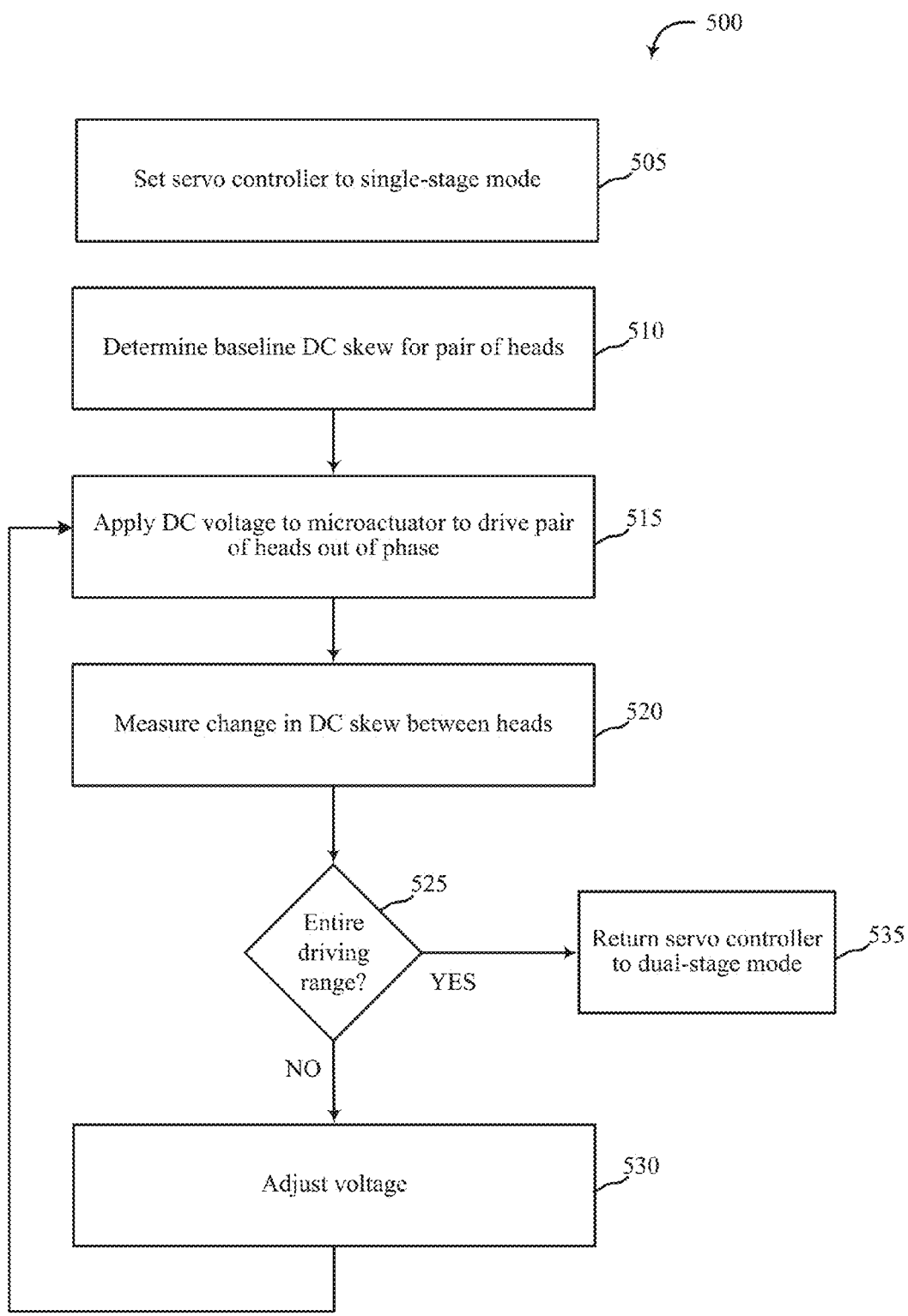
FIG. 5 is a flow chart illustrating an example of another method in accordance with various aspects of this disclosure.

FIG. 5 is a flow chart illustrating an example of another method 500 for hysteresis compensation in a disc drive, in accordance with various aspects of the present disclosure. More specifically, the method 500 may be employed to characterize the hysteresis of one or more microactuators in a disc drive. One or more aspects of the method 500 may be implemented in conjunction with the data storage system 100 of FIG. 1, the hysteresis linearization module 130-*a* of FIG. 2, and/or the subassemblies 300 of FIG. 3. In some examples, a storage device may execute one or more sets of codes to control the functional elements of the storage device to perform one or more of the functions described below. Additionally or alternatively, the storage device may perform one or more of the functions described below using special-purpose hardware.

At block 505, the method 500 may include setting a servo controller associated with the microcontroller(s) to a single-stage mode. At block 510, the method 500 may include determining or otherwise obtaining a baseline direct current (DC) skew for a pair of heads associated with the microactuator(s). At block 515, the method 500 may include applying a DC voltage to the microactuator(s) to drive the heads out of phase. At block 520, the method 500 may include measuring a change in DC skew between the heads with the applied voltage.

Next at block 525, the method 500 may include determining whether the entire driving range has been covered for the microactuator(s) by the applied DC voltage. For the first instance of applying a voltage at block 515, the entire range is not covered. Thus, the method 500 may continue to block 530, at which the method 500 may include adjusting the voltage. The method 500 then returns to block 515, at which the adjusted voltage is applied.

The operations at blocks 515-525 are repeated using the adjusted voltage from block 530 for each iteration. The operation(s) at block 530 may be performed so that the voltage is ramped progressively up and down the entire driving range of the microactuator(s). Thus, after a certain number of iterations, the determination at block 525 will be that the entire driving range of the microactuator(s) has been covered. In such case, the method 500 jumps to block 535, at which the servo controller is returned to a dual-stage mode (e.g., for performing normal read/write operations). Having covered the entire driving range of the microactuator(s), the method 500 should result in sufficient measurements to establish a hysteresis curve for the microactuator(s).

The operations at blocks 505-535 may be performed using the hysteresis linearization module 130 described with reference to FIGS. 1 and 2 and/or another module. Thus, the method 500 may provide a characterization of hysteresis of a microactuator(s) for implementing hysteresis compensation as described herein. It should be noted that the method 500 is just one implementation and that the operations of the method 500 may be rearranged, omitted, and/or otherwise modified such that other implementations are possible and contemplated. For example, depending on a size of the voltage adjustment at block 530, the method 500 may continue through two or more iterations of the entire driving range of the microactuator(s) to obtain sufficient measurements to characterize the hysteresis. In such case, the determination at block 525 may be modified, for example, to a determination as to whether sufficient measurements have been made, or whether a desired number of iterations over the driving range have been completed.

In some examples, aspects from the methods 400 and 500 may be combined and/or separated. It should be noted that the methods 400 and 500 are just example implementations, and that the operations of the methods 400 and 500 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage device comprising:
a data storage medium;
microactuator configured to move one or more read/write heads relative to the data storage medium;
a servo controller associated with the microactuator, the servo controller being set to a single-stage mode; and
one or more processors configured to determine a baseline direct current (DC) skew for a pair of heads from the one or more read/write heads.

2. The storage device of claim 1, wherein determining the baseline DC skew is based at least in part on performing a head switch relative to the pair of heads.

3. The storage device of claim 1, the servo controller to apply a DC voltage to the microactuator to drive the pair of heads out of phase.

4. The storage device of claim 3, the one or more processors to measure a change in DC skew relative to the pair of heads.

5. The storage device of claim 4, the servo controller to repetitively adjust the DC voltage and apply the adjusted DC voltage, and the one or more processors to repetitively measure the change in DC skew for each adjusted DC voltage until adjustments to the DC voltage cover an entire driving range of the microactuator.

6. The storage device of claim 5, the one or more processors to generate a hysteresis curve based at least in part on the repeated applying of the DC voltage and measuring of the change in DC skew over the entire driving range of the microactuator.

7. The storage device of claim 5, the one or more processors to generate a hysteresis model of the microactuator based at least in part on the repeated applying of the DC voltage and measuring of the change in DC skew over the entire driving range of the microactuator.

8. The storage device of claim 7, the one or more processors to implement a hysteresis compensator based at least in part on an inverse of the hysteresis model.

9. The storage device of claim 8, wherein the hysteresis compensator includes a digital filter placed in series with the microactuator.

10. The storage device of claim 5, wherein the servo controller is set to a dual-stage mode upon determining adjustments to the DC voltage cover the entire driving range of the microactuator.

11. An apparatus comprising:
a data storage medium;
a microactuator configured to move one or more read/write heads relative to the data storage medium;
a servo controller associated with the microactuator, the servo controller being set to a single-stage mode; and
one or more storage controllers configured to determine a baseline direct current (DC) skew for a pair of heads from the one or more read/write heads.

12. The apparatus of claim 11, wherein determining the baseline DC skew is based at least in part on performing a head switch relative to the pair of heads.

13. The apparatus of claim 11, the servo controller to apply a DC voltage to the microactuator to drive the pair of heads out of phase.

14. The apparatus of claim 13, the one or more storage controllers to measure a change in DC skew relative to the pair of heads.

15. The apparatus of claim 14, the servo controller to repetitively adjust the DC voltage and apply the adjusted DC voltage, and the one or more storage controllers to repetitively measure the change in DC skew for each adjusted DC voltage until adjustments to the DC voltage cover an entire driving range of the microactuator.

16. The apparatus of claim 15, the one or more storage controllers to generate a hysteresis curve based at least in part on the repeated applying of the DC voltage and measuring of the change in DC skew over the entire driving range of the microactuator.

17. The apparatus of claim 15, the one or more storage controllers to generate a hysteresis model of the microactuator based at least in part on the repeated applying of the DC voltage and measuring of the change in DC skew over the entire driving range of the microactuator.

18. The apparatus of claim 17, the one or more storage controllers to implement a hysteresis compensator based at least in part on an inverse of the hysteresis model, wherein the hysteresis compensator includes a digital filter placed in series with the microactuator.

19. A method comprising:
setting a servo controller of a storage drive to a single-stage mode;
determining, via a storage controller of the storage drive, a baseline direct current (DC) skew for a pair of read/write heads of the storage drive, wherein determining the baseline DC skew is based at least in part on performing a head switch relative to the pair of heads.

20. The method of claim 19, characterizing the hysteresis further comprising:
applying a DC voltage to the microactuator to drive the pair of heads out of phase, the one or more storage controllers to measure a change in DC skew relative to the pair of heads.

* * * * *